(12) United States Patent
Nagapudi et al.

(10) Patent No.: US 8,879,570 B2
(45) Date of Patent: Nov. 4, 2014

(54) SYSTEMS AND METHODS FOR RECONFIGURING A NETWORK ADAPTER IN SLEEP MODE

(75) Inventors: Venkatesh Nagapudi, Milpitas, CA (US); Gary McClannahan, Rochester, MN (US); Mark Branstad, Rochester, MN (US); Yash Bansal, Sunnyvale, CA (US); Gustavo Lau, Milpitas, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 505 days.

(21) Appl. No.: 12/964,221

(22) Filed: Dec. 9, 2010

(65) Prior Publication Data
US 2011/0078299 A1    Mar. 31, 2011

Related U.S. Application Data

(63) Continuation-in-part of application No. 12/570,565, filed on Sep. 30, 2009.

(60) Provisional application No. 61/240,184, filed on Sep. 4, 2009.

(51) Int. Cl.
*H04L 12/28* (2006.01)
*G08C 17/00* (2006.01)
*H04L 12/12* (2006.01)
*H04L 12/24* (2006.01)

(52) U.S. Cl.
CPC ............. *H04L 41/0803* (2013.01); *Y02B 60/32* (2013.01); *H04L 12/12* (2013.01); *Y02B 60/34* (2013.01)
USPC ............................ 370/419; 370/311; 370/420

(58) Field of Classification Search
CPC .............. H04L 41/0803; H04L 41/085; H04L 41/0866; H04L 41/0813; H04L 41/0806; H04L 41/0823; H04L 41/0816; H04L 41/082

USPC ......... 370/419, 420, 400, 389, 392, 396, 240, 370/242, 252–254, 412, 413, 311; 709/220–222, 223–226; 714/4, 31; 707/636, 640
See application file for complete search history.

(56) References Cited

U.S. PATENT DOCUMENTS 5,983,353 A * 11/1999 McHann, Jr. ................. 713/310
6,122,748 A *  9/2000 Hobson ......................... 713/323
(Continued)

FOREIGN PATENT DOCUMENTS

CN    101626613 A    1/2010
CN    101854294 A    10/2010
(Continued)

OTHER PUBLICATIONS

European Search Report dated Feb. 9, 2012 for European Patent Application No. 11190366.2.
(Continued)

*Primary Examiner* — Hanh N Nguyen
(74) *Attorney, Agent, or Firm* — Wong, Cabello, Lutsch, Rutherford & Brucculeri, L.L.P.

(57) ABSTRACT

A converged network adapter in sleep mode can allow a management entity to access and alter configuration of the network adapter over the network. Configuration data such as configuration parameters, firmware, and other data related to the network adapter can be stored in a memory, which can be coupled to a portion of the adapter that receives power during sleep mode. The management entity can send configuration messages to the adapter, which messages can include commands or instructions to read or write contents of the memory. The messages can include values of the configuration parameters to be altered, firmware code, etc. The management entity can also send configuration messages to a baseboard management controller (BMC) coupled to the adapter for message validation. The adapter and the BMC can send results of memory operations back to the management entity in response messages.

19 Claims, 8 Drawing Sheets

(56) References Cited

U.S. PATENT DOCUMENTS

| | | | | |
|---|---|---|---|---|
| 6,353,854 B1* | 3/2002 | Cromer et al. | ............... | 709/224 |
| 6,480,972 B1 | 11/2002 | Cromer | | |
| 6,681,244 B1* | 1/2004 | Cross et al. | .................. | 709/203 |
| 6,694,360 B1 | 2/2004 | Duguay | | |
| 8,095,667 B1* | 1/2012 | Karl | .............................. | 709/227 |
| 8,209,287 B2* | 6/2012 | Thapa | .......................... | 707/636 |
| 2007/0218938 A1* | 9/2007 | Carter | .......................... | 455/528 |

FOREIGN PATENT DOCUMENTS

| | | |
|---|---|---|
| EP | 1884868 A2 | 2/2006 |
| EP | 1884868 A3 | 5/2008 |
| EP | 2288077 A1 | 2/2011 |

OTHER PUBLICATIONS

Chinese Office Action issued in corresponding Chinese Application No. 201110407903.8 dated Feb. 8, 2014, 19 pages (with translation).

* cited by examiner

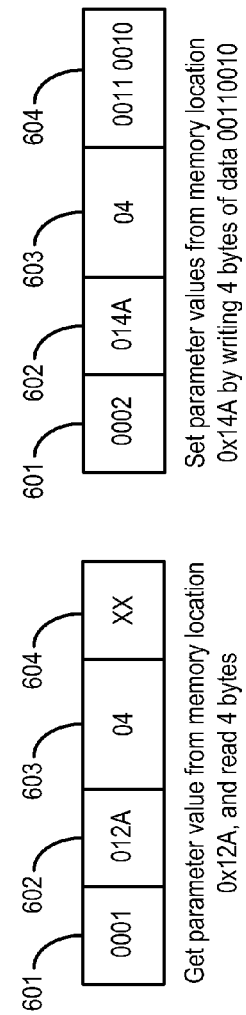

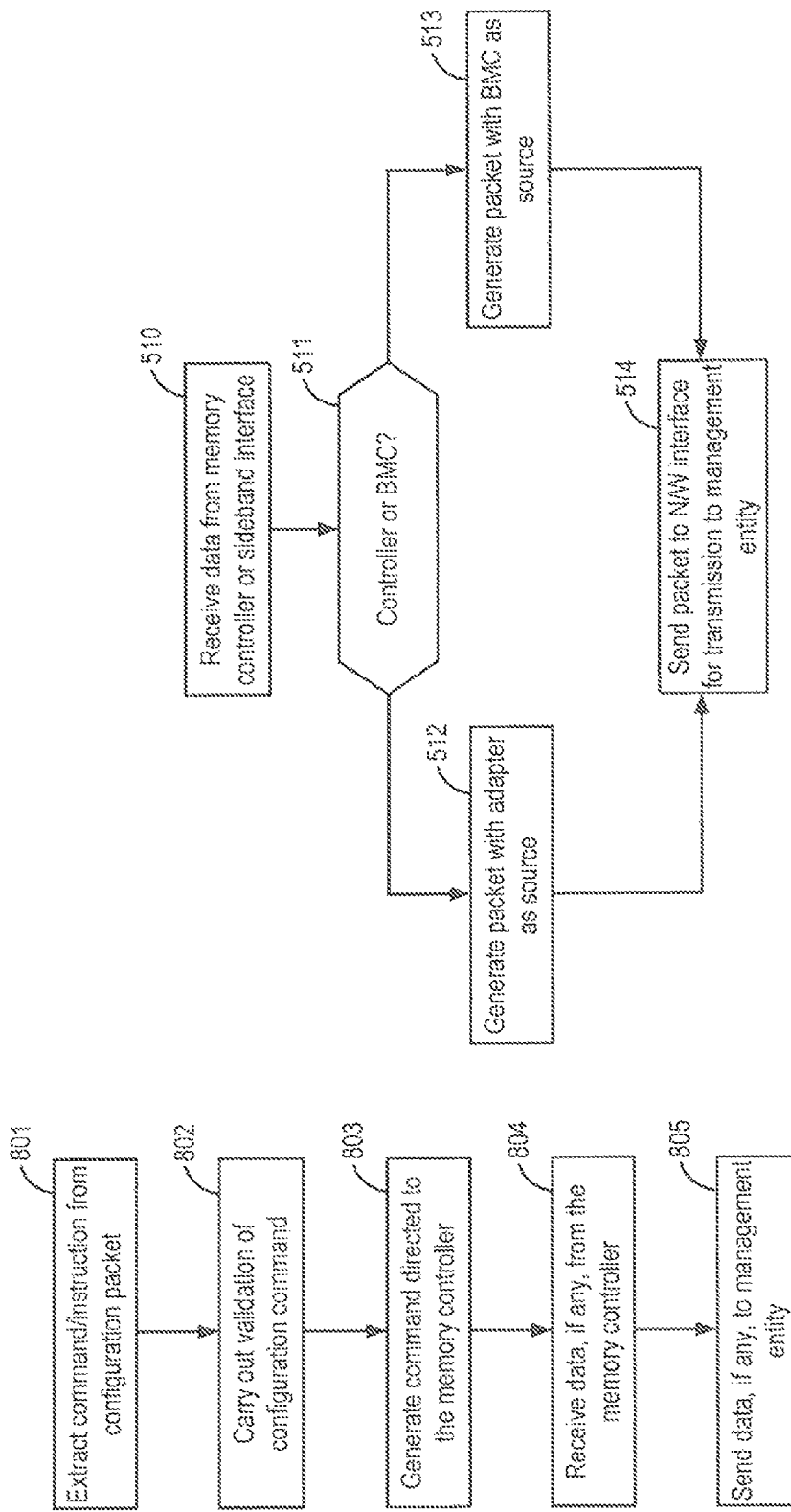

SYSTEMS AND METHODS FOR RECONFIGURING A NETWORK ADAPTER IN SLEEP MODE

RELATED APPLICATIONS

This application is a continuation-in-part of co-pending U.S. patent application Ser. No. 12/570,565 entitled "User Selectable Multiple Protocol Network Interface Device," filed on Sep. 30, 2009, which in turn claims benefit of U.S. Provisional Application No. 61/240,184 filed Sep. 4, 2009.

BACKGROUND OF THE INVENTION

1. Field of the Invention

The present invention relates generally to networks. Particularly, the present invention relates to reconfiguration of a network adapter.

2. Description of the Related Art

Traditional network environments use multiple network types for accomplishing different tasks. In a common scenario, a datacenter may have a Fibre Channel (FC) based storage area network (SAN) for data storage operations and an Ethernet based local area network (LAN) for interconnecting servers and individual workstations. Both FC and Ethernet may require distinct physical mediums, and consequently, the datacenter would require separate components, adapters, cables, switches, and network management entities. This multiplicity of networks not only increases costs, but also increases complexity.

One approach towards reducing costs and complexity proposes converging multiple networks into a single network, where the single network carries various traffic types of the other networks. For example, a converged enhanced Ethernet (CEE) network can use the Ethernet network as the single link, which carries multiple traffic types such as storage (e.g., FC), LAN, management, etc. One emerging industry standard is called the Fibre channel over Ethernet (FCoE or FCoCEE), which uses FC packets and commands normally used in Fibre Channel but encapsulates them in Ethernet packets. Despite the growing popularity of FCoE, it is understood that FC SANs will remain in use and continue to be installed for some time.

This developing situation of CEE networks and FC SANs presents problems for both manufactures and users. For a native connection to FC SAN, a Fibre channel host bus adapter (FC HBA) is needed. For connection to a CEE network, a converged network adapter (CNA) is needed. To alleviate the problems associated with investing and managing separate interface cards or boards, some manufactures have introduced network interfaces that can be configured to operate on a FC SAN, a CEE, or both. An exemplary block diagram of one such network interface card is shown in FIG. 1.

FIG. 1 shows a server 101 connected to a network adapter 102 via a PCIe bus 106. Adapter 102 can include both FC HBA module 108 and CNA module 109. One or more ports of the adapter can be configured to couple to either the FC HBA module 108 or the CNA module 109. Configuration information can be stored in the memory 107. To actually configure the adapter, BIOS 104 in the server 101 accesses configuration information from the memory 107, and load the appropriate registers in the adapter 102. To change the configuration of the adapter 102, configuration information stored in memory 107 needs to be changed. Changing configuration information is typically possible only through the BIOS 104. Consequently, any management entity wanting to change the adapter configuration would have to communicate with the server BIOS 104 to affect such change.

Being dependent on the BIOS 104 for changing adapter 102 configuration can be cumbersome. For example, the server 101 would have to be powered on to allow access to the BIOS 104. Often when servers are not busy, they are shut down. Therefore, if the server 101 is shutdown, the adapter 102 cannot be reconfigured. Some methods use wake-on-LAN (WOL) operations to power on the server to allow access to the BIOS 104 and then carry out reconfiguration operations. But even in these methods, the server needs to be powered on in order to reconfigure it. Furthermore, reconfiguring the adapter 102 while it is powered up may disrupt its normal operations. Even further, a management entity wanting to reconfigure adapters in a server farm would have to be physically present at each and every server in order to carry out the reconfiguration.

SUMMARY OF THE INVENTION

A network adapter in sleep mode can allow a management entity to access and alter configuration data of the network adapter over the network. During sleep mode, the network adapter maintains power supply to an auxiliary portion of the adapter. The auxiliary portion includes a memory, a wake-on-LAN (WOL) logic, and a baseboard management controller (BMC). The memory can include configuration parameters, firmware, and other data relevant to the adapter. The management entity can access and alter the memory, including configuration parameters, firmware, etc., directly through the WOL logic or indirectly through the BMC.

The management entity can send configuration messages to the adapter, which configuration messages can include commands to read or write data from or to the memory. The configuration messages can be Ethernet frames if the active port of the adapter in sleep mode is an Ethernet port. Similarly, if the active port of the adapter during sleep mode is an FC port, then the configuration messages can be FC frames. The management entity can address the configuration messages to the adapter or the BMC. The payload of the configuration message can include commands or instructions for reading or writing configuration parameters, updating firmware, etc. The BMC can carry out validation and security operations on the received message before sending the command or instruction to the adapter.

The command or instruction in the payload of the configuration message can include the name or location of a configuration parameter and, if the configuration parameter is to be altered, a corresponding value. The command or instruction can also include code to update firmware stored in memory. Generally, the commands or instructions can read/write at any location in the memory. A memory controller coupled to the memory can execute the command and return any results (e.g., during read operation). The result can be enclosed in a response message and sent back to the management entity. If the command was received from the BMC, then the result can be communicated to the BMC. The BMC, in turn, can send the result back to the management entity in a response message.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 7A illustrates an exemplary format for a command or instruction received from the management entity.

FIG. 7B-7C show exemplary commands or instructions to be executed by the memory controller.

FIG. 8 illustrates an exemplary flowchart of the steps performed by the baseboard management controller.

FIG. 9 illustrates an exemplary flowchart of the steps performed by the packet processor for sending response packets to the management entity.

DETAILED DESCRIPTION

Figure 1:
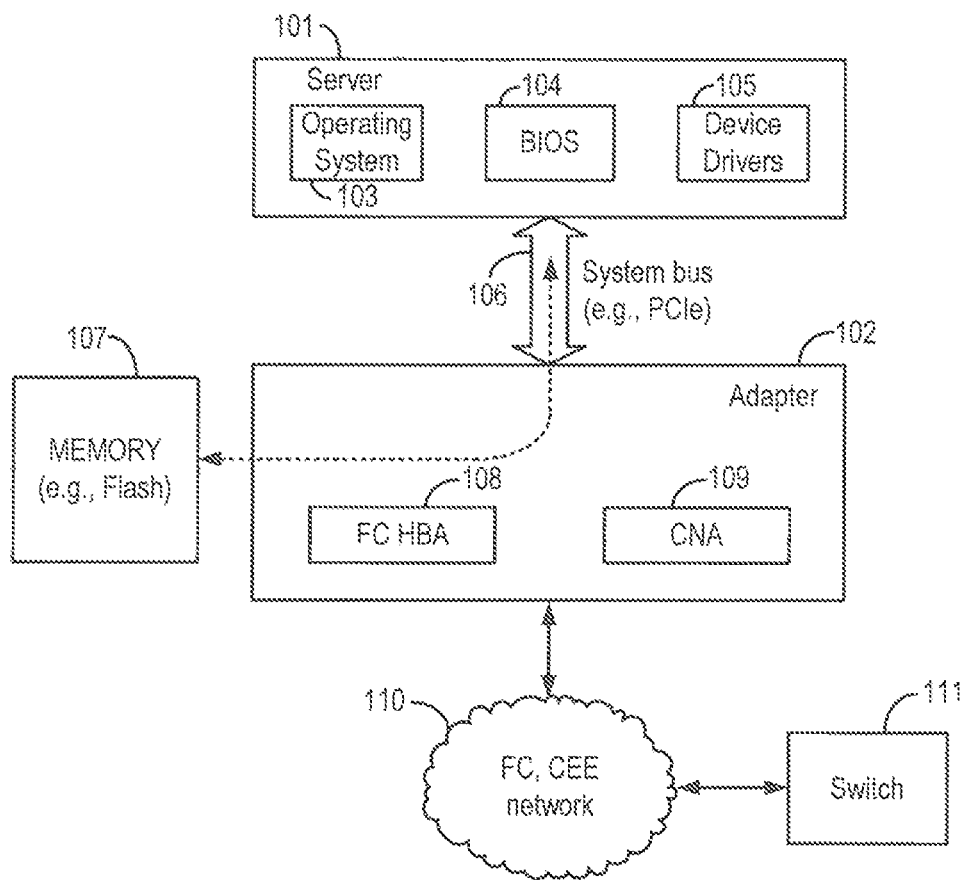
FIG. 1 depicts the traditional method altering adapter configuration parameters via the BIOS.
Figure 2:
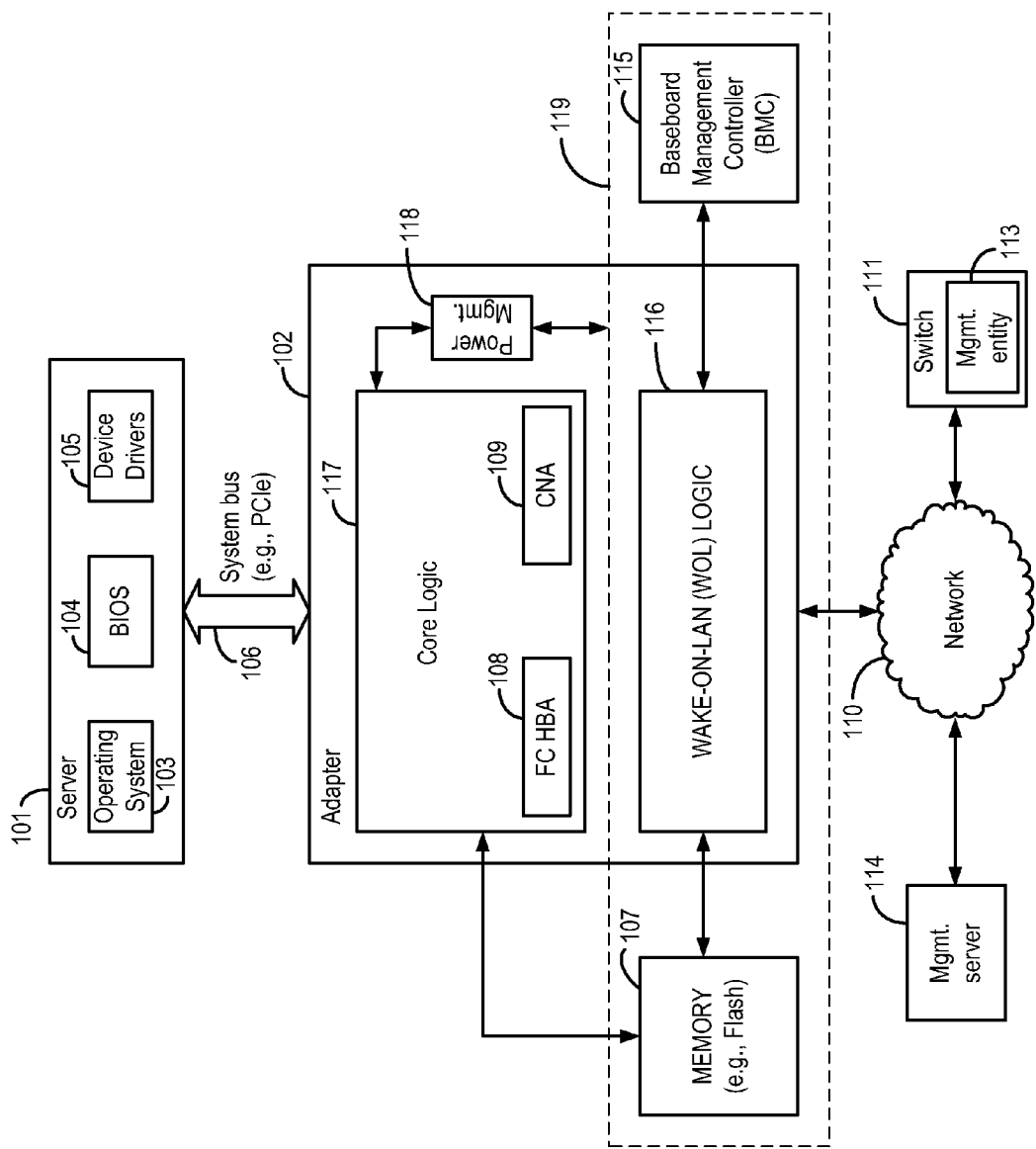
FIG. 2 illustrates a block diagram of an exemplary adapter that can be configured in sleep mode.

FIG. 2 illustrates an exemplary adapter 102 that can be configured when in sleep mode (or partial shutdown mode) via the network 110. Typically, the configuration is carried out by a management entity 113 located in switch 111. However, the management entity can be located anywhere in network 110, and not just in switch 111. For example, management server 114 can be connected to network 110, and can communicate with the adapter 102 as well as the switch 111 and the management entity 113. It is also envisioned that the management server 114 can reconfigure the switch 111 and the management entity 113. Consequently, reconfiguration of adapter 102 can be carried out remotely from any location that can communicate with adapter 102 over network 110. Thus, adapter configuration can be considered to be network-centric, in contrast with traditional server-centric approaches. Network-centric adapter reconfiguration can conveniently allow a management entity (e.g., management server 114, management entity 113, etc.) to remotely reconfigure several adapters without the need to be physically present where the adapters are located. Network 110 can represent a "cloud" providing on-demand network access to a shared pool of configurable computing resources (e.g., networks, servers, storage, applications, and services). The adapter 102 can be reconfigured by the cloud based on the changes within the cloud without intervention of the server itself, which changes can include change in the type of network, changes in bandwidth, congestion, etc.

Adapter 102 can include power management functionality allowing the adapter 102 to power down a portion of the adapter hardware to regulate energy consumption. In the exemplary system shown in FIG. 2, the adapter 102 can include a power management module 118 for managing the power supplied to various portions of the adapter 102. Power management module 118 can supply power separately to two regions in the adapter 102—the core logic portion 117 and the auxiliary portion 119. The core logic portion 117 can include the Ethernet subsystem and the FC subsystem. The auxiliary portion 119 can include a wake-on-LAN (WOL) module, memory 107 and baseboard management controller (BMC) 115. During power save mode or sleep mode, the power management module 118 can reduce or shutdown power supply to core logic 117 while maintaining power to the auxiliary portion 119 of the adapter 102. Note that power management module 118 can also extend the power shutdown to the PCIe bus 106 and one ore more components of the server 101. In such cases, the power management module 118 operates responsive to power management logic and software elsewhere in the server 101.

The auxiliary portion 119 can remain operational during sleep mode. Although memory 107 and BMC 115 have been shown separate form the adapter 102, it is understood that they can be an integral part of the adapter 102. Memory 107 can be a non-volatile memory such as a programmable ROM, Flash, etc. Typically, memory 107 can be used to store configuration information of the adapter 102, which configuration information can include device personality, port personality, etc. Furthermore, the memory 107 can be used to store firmware that operates and controls the core logic 117.

Figure 3:
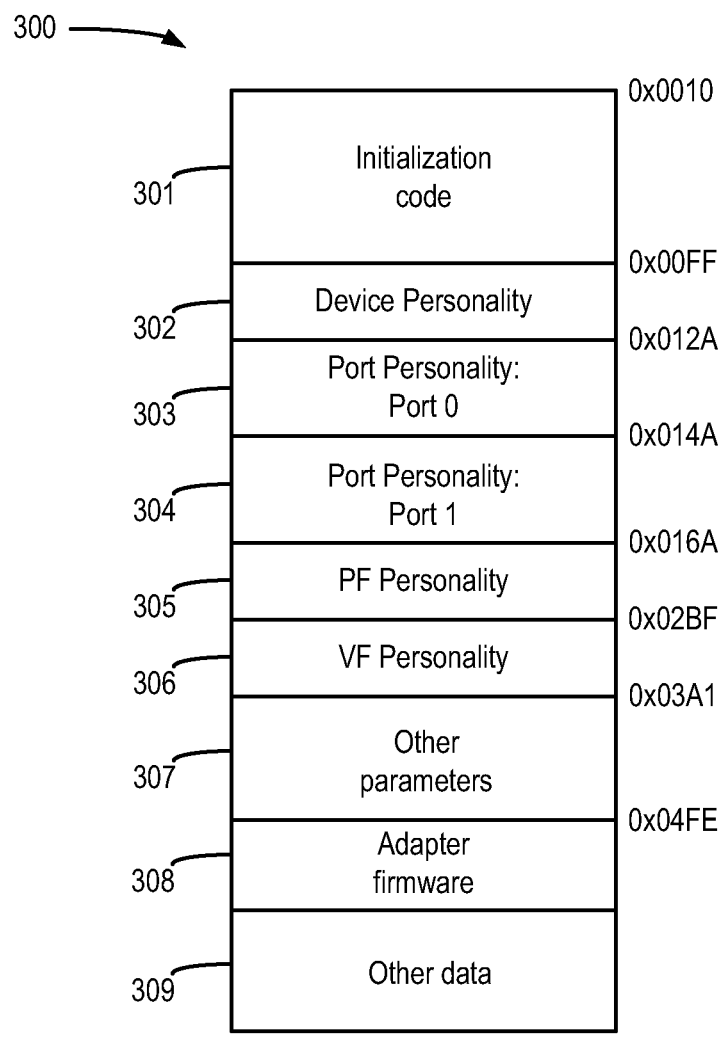
FIG. 3 shows an exemplary memory map showing memory locations of various configuration parameters.

FIG. 3 shows an exemplary memory map 300 of memory 107 for storing configuration information for adapter 102. The displayed memory locations have been chosen merely to aid discussion and it is understood that these memory locations may vary in actual implementations. For example, the initialization code 301 can be stored starting at memory location 0x0010. The initialization code 301 can include code or register values related to initializing the WOL logic 116, the BMC 115, or any other component that may need initializing during sleep mode. The initialization code 301 can also include code or register values related to initializing the core logic 117 during power up. The initialization code may also be executed each time the auxiliary portion 119 and/or the core logic portion 117 is powered up. Device personality parameters 302 can be stored at memory location 0x00FF. Device personality parameters determine the mode in which the adapter can operate, which modes can include FC-HBA, FCoE/NIC, and mixed HBA/NIC. In FC-HBA mode, the adapter 102 can operate as a Fibre channel host bus adapter. All ports of the adapter 102 can operate in FC mode. In FCoE/NIC mode, the adapter 102 can operate as an Ethernet adapter with FCoE capabilities. In mixed. HBA/NIC mode, at least one port of the adapter can operate in FC mode while at least another port will operate in Ethernet mode. Parameter bits can be stored beginning at memory location 0x00FF for setting the device personality. Port personalities (303 and 304) can be set beginning at memory location 0x012A. Because the adapter 102 can have multiple ports, parameters related to each port can be set individually. For example, parameters 303 for Port 0 can include type of port (e.g., FC or Ethernet), port speed (e.g., 14 Gbps FC, 10 Gbps FC (Ethernet speed), 10.2 Gbps standard FC, 8 Gbps FC, etc.), single/dual port (e.g., two 8 Gbps ports trunked for transferring 16 Gbps), etc. Similar parameters 304 can be set for Port 1 at memory location 0x014A. Although not shown, memory locations for parameters of additional ports can also be included. PF (physical function) personality 305 (e.g., at memory location 0x016) can define PCIe physical functions and their mappings to various logical functions or ports in the adapter 102. Parameters can be stored for each PF, which parameters can include mapped port #, type of port (e.g., FC/Ethernet), activate/deactivate PF, etc. Parameters 306 for VFs (virtual functions) can be stored at memory location 0x02BF. PCIe single root input-output virtualization (SIOV) binds virtual machines (VMs) to VFs inside the PCIe core. To a VM, each VF can appear as an independent Ethernet/FC/FCoEE, which can be configured by VF parameters. Other parameters 307 related to the configuration of the adapter 102 can be stored starting at memory location 0x03A1. Memory 107 can also include firmware 308 starting at memory location 0x04FE. Firmware 308 can include code executed by the core logic 117 to initialize and or configure the core logic 117. Any other data 309 related to the adapter can be stored in the remaining portion of the memory 107.

Referring again to FIG. 2, BMC 115 can be a management controller that is typically used to monitor the health of the server hardware. It can collect information and routine statistics from various sources within the system periodically and update a remote management agent, such as the management entity 113. It can also alert the management entity 113 of any failures within the system. BMC 115 can also be used to reconfigure memory 107. BMC 115 communicates with the adapter 102 using a sideband interface (121, in FIG. 4). BMC 115 can be based on the Intelligent Platform Management Interface (IPMI) specifications, which are well known in the art. The sideband interface can be the network controller sideband interface (NC-SI) specification detailed by the Distributed Management Task Force, Inc.

Typical wake-on-LAN modules include hardware that listens to incoming packets for a wake-up packet or a so called magic packet. The WOL portion 116 of FIG. 2 not only listens for magic packets, but also listens for configuration packets. When WOL 116 receives valid magic packets, it notifies the power management module 118, which, in turn, can wake up, i.e., restore power supply to the core logic 117. When WOL 116 receives configuration packets, it processes the packets according to data stored in the packet to carry out configuration functions (as explained in detail below). The WOL portion 116 receives continuous power from power management module 118 even when the core logic 117 is in power down mode.

Figure 4:
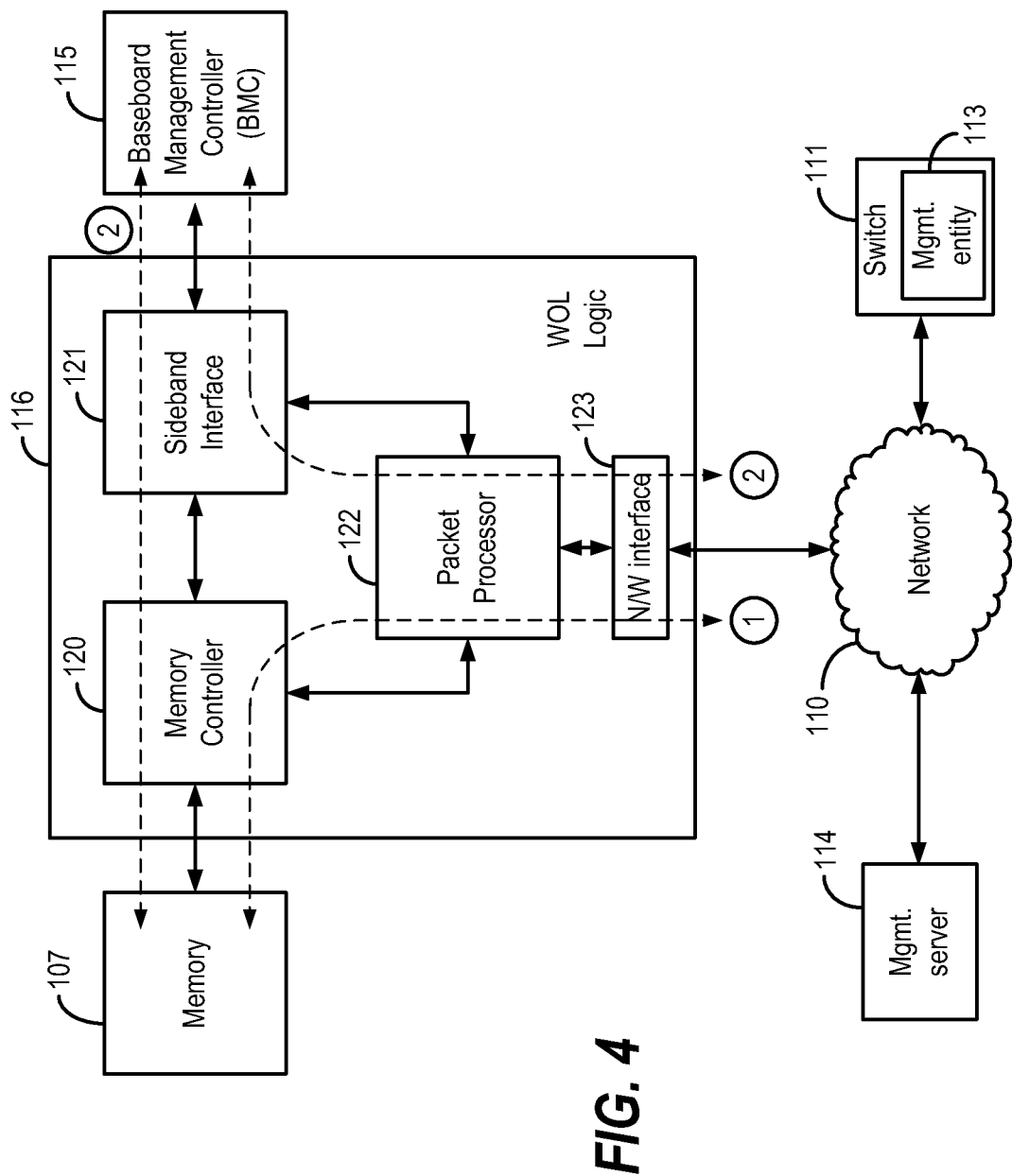
FIG. 4 illustrates a block diagram of an exemplary wake-on-LAN module providing access to adapter configuration information stored in memory.

FIG. 4 illustrates an exemplary functional block diagram of WOL 116. WOL 116 can include a memory controller 120, a sideband interface 121, a packet processor 122, and a network interface 123. Memory controller 120 communicates with memory 107 while sideband interface 121 communicates with BMC 115. Packet processor 122 inspects received packet headers for configuration packets or wake-up magic packets. Packet processor also aids in generating outgoing packets. Network interface 123 forms an interface between the adapter 102 and the network. The type of interface can depend upon the type of network connected to the adapter. For example, in case of an Ethernet network, the network interface 123 can include a 10/100/1G Ethernet MAC and a serializer-deserializer (SerDes). In case the network 110 is an FC network, the network interface 123 can include a FC MAC and a SerDes.

Management entity 113 can configure contents of memory 107 via WOL 116 in two ways. It can read/write configuration parameters from/to memory 107 directly via the memory controller 120 or via BMC 115. Configuring memory 107 via BMC 115 allows the BMC 115 to provide additional security.

Figure 5:
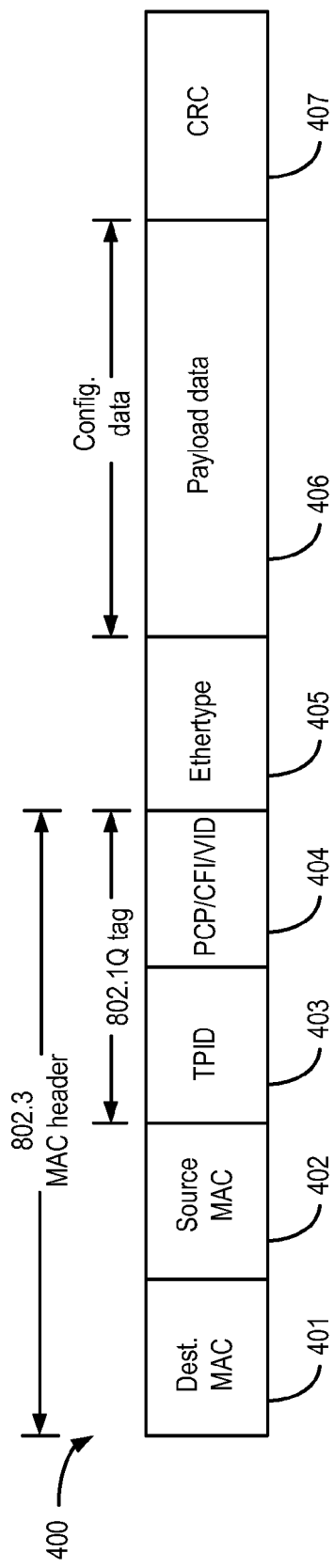
FIG. 5 shows an exemplary format of a configuration packet sent by an management entity.

Management entity 113 can transmit configuration packets to the WOL 116. FIG. 5 shows exemplary format of an Ethernet configuration packet 400 sent by the management entity 113 to the WOL 116. The destination address field 401 can include the address of the adapter 102 or the address of the BMC 115. Source address field 402 can include the source address of the switch 111 or the management entity 113. In scenarios where virtual LANs are present, the 802.1q header (fields 403 and 404) can include the appropriate values for TPID (tag protocol identifier), PCP (priority code point), CFI (canonical format indicator), and VID (ULAN identifier). As an example, a VID indicating that the packet is a configuration packet may be used. Ethertype field 405 can indicate which type of protocol is encapsulated in the payload. Ethertype values can be standard 802 ethertype or can be proprietary. For example, the ethertype may be 0x0842, which indicates that the payload includes data related to wake-on-LAN type protocol. The payload data in field 406 can include data, instructions, and commands to be sent to the memory controller 120 or the BMC 115. Finally, field 407 can include cyclic redundancy check bits based on destination address, type, and payload data.

It is understood that the configuration packet 400 can be a FC packet instead of an Ethernet packet if the WOL portion 116 is connected to a FC network during sleep mode.

Figure 6:
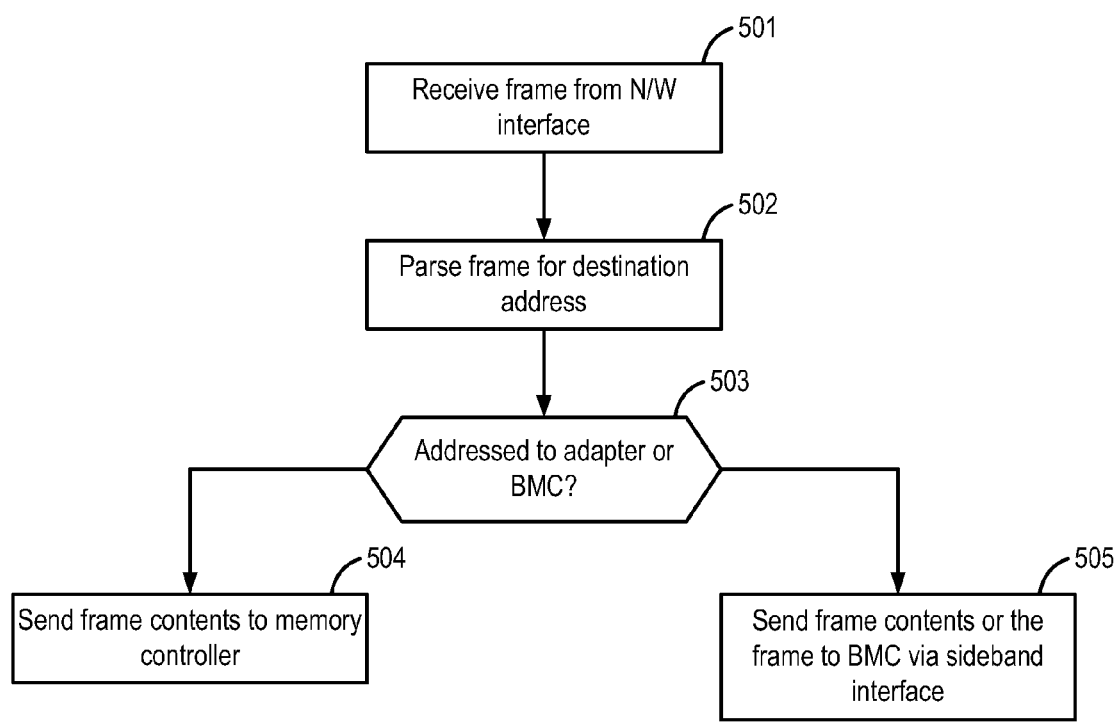
FIG. 6 illustrates an exemplary flowchart of the steps performed by the packet processor on receiving a configuration packet.

FIG. 6 shows an exemplary flowchart describing the operation of packet processor 122. In step 501 packet processor 122 can receive the Ethernet packet from the network interface 123. In step 502, packet processor 122 can parse the received packet for a destination address. For example, with reference to the configuration frame 400, it can parse field 401 Destination MAC. In step 503 the packet processor 122 can determine whether the configuration packet has been addressed to the adapter 102 or the BCM 115. If the packet has been addressed to the adapter 102, then the packet payload data 406 can be communicated to the memory controller 120. If the packet has been addressed to the BMC 115, then the packet payload data 406 can be communicated to the sideband interface 121. Alternatively, the entire packet 400 addressed to the BMC 115 can be passed to the sideband interface 121, which, in turn, can pass the entire packet to the BMC 115.

Payload data 406 of packet 400 can include instructions or commands for reading or writing data from/to the memory 107. The commands may depend on whether the configuration packet is directed to the memory controller 120 or the BMC 115. As an example, FIG. 7A shows a command format included in a configuration packet directed to the memory controller 120. Field 601 can include operation codes, or opcodes, that encode the operation to be performed by the memory controller. For example, opcode 0001 can specify a read operation in which the memory controller reads the value of a specified parameter. Opcode 0002 can specify a write operation in which the value of the specified parameter can be set to the desired value. Opcode 0003 can specify a reset operation, in which all configuration parameters in memory 107 can be erased. Opcode 0004 can specify that the firmware 308 needs to be updated. Opcode 0005 can specify reading data at a specified memory location, which may include data other than configuration parameters (e.g., other data 309, FIG. 3). Opcode 0006 can specify writing data at a particular memory location. Opcode 00FF can specify that the final command has been reached. It is understood that the list of opcodes shown in FIG. 7A is not exhaustive, and can include opcodes of various other operations such as transferring data from one memory location to another, arithmetic operations, logical operations, etc.

Field 602 can either specify a particular parameter or the location of the parameter in memory 107. For example, referring to FIG. 3, field 602 may include the text "device personality" or an identifier (e.g., 0x02) for the device personality parameter or may include the starting address 0x00FF. Field 602 can also specify a memory location within memory 107 that stores data other than configuration parameters. For example, field 602 can specify a memory location starting from 0x04FE (FIG. 3) that stores firmware 308. Generally, field 602 can specify any location in memory 107 for read or write operations. Field 603 can include the length of data to be written to or read from the memory 107. Finally field 604 can include the actual values of the parameters, code, or other data, to be written to memory 107.

FIG. 7B illustrates an exemplary instruction for reading parameter values from memory 107. The command has an opcode 0001, which specifies that it is a get or read command. Field 602 specifies memory location 0x012A as the memory location from which the values of parameters are to be read. Referring to FIG. 3, memory location 0x012A corresponds to port 0 personality parameters. Field 603 specifies that 4 bytes of data is to be read starting from memory location 0x012A. Because this is a read operation, the data field 604 can be ignored.

FIG. 7C illustrates an exemplary instruction for setting parameter values in memory 107. The command has an opcode 0002, which specifies that it is a write command. Field 602 specifies the memory location 0x014A as the memory location where data is to be written. Referring to FIG. 3, memory location 0x014A corresponds to port 1 personality parameters. Field 603 specifies that 4 bytes of data is to be written, and field 604 specifies the actual data, 00110010, to be written.

Other instructions or commands can reflash or update the firmware with new data. Such data can include instructions or code that can be loaded from the memory 107 to processors within the core logic 117, for example, in FC HBA 108 and CNA 109.

It is understood that the format of commands and instructions illustrated in FIGS. 7A-7C are only exemplary, and a person skilled in the art can envision various other formats for accomplishing the same result, i.e., manipulation of configuration parameters stored in memory 107. The format of the commands or instructions can vary based on the type of memory controller being used.

Memory operations can be carried out by memory controller 120. Commands or instructions for memory operations can be received form the packet processor 122 or the BMC 115 via the sideband interface 121. Memory controller 120 can be, for example, a microcontroller, a sequential state machine, or the like. The controller can also include instruction and data buffers, address translation logic, control and timing circuitry, memory interface circuitry, etc. Components of the memory controller 120 can depend on the type of non-volatile memory 107 being used. For example, if memory 107 is a NAND Flash, then the memory controller will have NAND Flash specific components.

Memory controller 120 can execute instructions or commands and present the result of execution at its output ports or output port buffers. For example, after executing the command shown in FIG. 7B, the memory controller can provide 4 bytes of data read from the memory location 0x012A in memory 107. Results of the execution of a command can be made available to the module (e.g., BMC 115 or packet processor 122) from which the command is received.

Referring again to FIG. 4, when the packet processor 122 receives a configuration packet having the destination address of the BMC 115, the configuration packet is directed to the BMC 115 via the sideband interface 121. The configuration packet received by BMC 115 can have the same format as the one shown in FIG. 5. Furthermore, the command and instruction within the payload field 406 can be the same as the one shown in FIG. 7A-7C.

FIG. 8 shows an exemplary flowchart or the steps performed by the BMC 115 for configuring memory 107. Once the BMC 115 has received the configuration packet from the packet processor 122, it can extract the payload data, which includes the configuration command or instruction (step 801). The command and instruction within the payload field 406 can be the same as the one shown in FIG. 7A-7C. BMC 115 can then perform validation and security check of the configuration command in step 802. For example, BMC 115 can process the Ethernet checksum to verify the integrity of the configuration packet. Additionally, BMC 115 can also verify the integrity of the command, memory location, and length of data. BMC 115 can send the configuration command to the memory controller 120 for execution (step 803). Generally, the configuration command can be encapsulated inside the payload of an interface command, which interface command is received by the sideband interface 121. The sideband interface 121 can provide the configuration command to the memory controller 120 for execution. If the configuration command generates a response, for example, if the configuration command is a read memory command, then the BMC 115 can receive data back from the memory controller 120 via the sideband interface 121 (step 804). This data can be sent back to the management entity 113 by generating a data packet addressed to the management entity. The BMC 115 may generate this packet or may pass the data to the packet processor 122, which can generate the response packet addressed to the management entity 113.

FIG. 9 shows an exemplary flowchart of the steps performed by the packet processor 122 for communicating data back to the management entity 113. This data can be a result of read configuration commands (e.g., FIG. 6B) executed by the memory controller 120, or can be data generated by BMC 115. In step 510, packet processor can receive data from the memory controller 120 or the BMC 115 via sideband interface 121. In step 511 the packet processor determines whether the data is received from the memory controller 120 or the BMC 115. If the data is received form the memory controller 120, the packet processor 122 can generate a response packet having a source address of the adapter 102 and the received data as the payload data. If the data is received from the BMC 115, the packet processor 122 can generate a response packet with the source address of the BMC 115 and the received data as the payload data. The destination address of the response packets can be the network address of the management entity 113. Packet processor 122 can send the generated packets to the management entity 113 via the network interface 123 (step 514).

BIOS 104 updates are not needed in order to configure the adapter 102. Thus, adapters 102 can be shipped to customers with default personalities. Once connected to the network in sleep mode, the customer or any management entity can reconfigure the adapters 102 to the desired personality before they are brought out of sleep mode for the first time.

Once the configuration parameters of the adapter 102 have been set to desired values, these values can be loaded from memory 107 to registers in the adapter 102 during power up. Details of reconfiguring the adapter 102 based on the values stored in memory 107 can be found in the commonly owned U.S. patent application Ser. No. 12/570,565 entitled "User Selectable Multiple Protocol Network Interface Device," by Venkata Pramod Balakavi et al, and is hereby incorporated by reference.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method comprising:
providing access to a memory of a network adapter coupled to a system bus, the network adapter having core logic, a network interface, and auxiliary logic including the memory and coupled to the network interface and the core logic, wherein access is provided to the memory of the network adapter via the network interface of the network adapter when at least the core logic of the network adapter is in sleep mode.

2. The method of claim 1, wherein the memory of the network adapter is a non-volatile memory.

3. The method of claim 1, wherein providing access comprises allowing reading the memory of the network adapter.

4. The method of claim 3, wherein allowing reading comprises:
receiving a message specifying a memory location; and
sending a value associated with the specified memory location to a module from which the message was received.

5. The method of claim 4, wherein the message is addressed to the adapter.

6. The method of claim 4, wherein the message is addressed to a management controller included in the auxiliary logic.

7. The method of claim 6, further comprising sending the value only if the message is validated by the management controller.

8. The method of claim 1, wherein providing access comprises allowing altering the contents of the memory of the network adapter.

9. The method of claim 8, wherein allowing altering comprises:
receiving a message specifying a memory location and an associated value; and
altering the content of the specified memory location to the received associated value.

10. The method of claim 9, wherein the message is addressed to the network adapter.

11. The method of claim 9, wherein the message is addressed to a management controller included in the auxiliary logic.

12. The method of claim 11, further comprising altering the value only if the message is validated by the management controller.

13. A network adapter comprising:
core logic;
a network interface; and
auxiliary logic coupled to the core logic and the network interface, the auxiliary logic including:
a memory,
wherein the network adapter is coupled to a system bus and is configured to provide access to the memory via the network interface when at least the core logic of the network adapter is in sleep mode.

14. The network adapter of claim 13, further comprising a module coupled to the network interface and configured to carry out operations on the memory based on messages received via the network interface.

15. The network adapter of claim 14, wherein if the message is a read message, the read message specifying a memory location, the module is configured to access the memory for a value associated with the memory location and send a response message including the value via the network interface.

16. The network adapter of claim 14, wherein if the message is a write message, the write message specifying a memory location and a corresponding value, the module is configured to access the memory at the specified memory location and store the corresponding value.

17. The network adapter of claim 13, further comprising a management controller included in the auxiliary logic, the network adapter configured to direct to the management controller a message addressed to the management controller and received via the network interface.

18. The network adapter of claim 17, wherein the management controller is configured to validate the message and instruct the adapter to carry out a memory operation based on the content of the message.

19. The network adapter of claim 18, wherein the management controller is configured to receive a result of the memory operation and send a response message via the network interface of the network adapter back to a module from which the message was directed.

* * * * *